(12) United States Patent
Roba et al.

(10) Patent No.: US 7,764,855 B2
(45) Date of Patent: Jul. 27, 2010

(54) OPTICAL FIBER WITH CURED POLYMERIC COATING

(75) Inventors: Giacomo Stefano Roba, Monza (IT); Lidia Terruzzi, Triuggio (IT); Sabrina Fogliani, Segrate (IT); Luca Castellani, Corsico (IT); Emiliano Resmini, Busto Arsizio (IT); Raffaella Donetti, Ghemme (IT); Lisa Grassi, Milan (IT)

(73) Assignee: Prysmian Cavi e Sistemi Energia S.R.L., Milan (IT)

( * ) Notice: Subject to any disclaimer, the term of this patent is extended or adjusted under 35 U.S.C. 154(b) by 798 days.

(21) Appl. No.: 10/530,489

(22) PCT Filed: Oct. 7, 2002

(86) PCT No.: PCT/EP02/11202

§ 371 (c)(1),
(2), (4) Date: Jun. 26, 2007

(87) PCT Pub. No.: WO2004/031091

PCT Pub. Date: Apr. 15, 2004

(65) Prior Publication Data

US 2007/0263972 A1 Nov. 15, 2007

(51) Int. Cl.
*G02B 6/02* (2006.01)
*G02B 6/00* (2006.01)
*C08G 18/67* (2006.01)

(52) U.S. Cl. .................. 385/128; 385/141; 385/145; 522/90; 522/96

(58) Field of Classification Search ......... 385/126–128, 385/141, 144–145; 522/90, 96, 97
See application file for complete search history.

(56) References Cited

U.S. PATENT DOCUMENTS

| | | | |
|---|---|---|---|
| 4,682,850 A | 7/1987 | White et al. |
| 4,690,501 A | 9/1987 | Zimmerman et al. |
| 4,690,502 A | 9/1987 | Zimmerman et al. |
| 4,741,596 A | 5/1988 | Broer et al. |
| 4,794,133 A | 12/1988 | Moschovis et al. |
| 4,798,852 A | 1/1989 | Zimmerman et al. |

(Continued)

FOREIGN PATENT DOCUMENTS

JP 59-170154 9/1984

(Continued)

OTHER PUBLICATIONS

Abstract of JP 03-247671.

(Continued)

*Primary Examiner*—Charlie Peng
*Assistant Examiner*—Michael P Mooney
(74) *Attorney, Agent, or Firm*—Finnegan, Henderson, Farabow, Garrett & Dunner, L.L.P.

(57) ABSTRACT

An optical fiber having: a) a glass portion; and b) at least one protective coating layer disposed to surround the glass portion, the protective coating layer having a modulus of elasticity value between −40° C. and +60° C. between 5 MPa and 600 MPa, preferably not higher than 500 MPa, more preferably not higher than 450 MPa and much more preferably not higher than 300. Preferably the protective coating layer is a single protective coating layer which is disposed in contact with the glass portion.

61 Claims, 3 Drawing Sheets

U.S. PATENT DOCUMENTS

| | | | |
|---|---|---|---|
| 4,806,574 A | | 2/1989 | Krajewski et al. |
| 4,932,750 A | | 6/1990 | Ansel et al. |
| 5,822,489 A | * | 10/1998 | Hale .......................... 385/145 |
| 5,913,004 A | | 6/1999 | Takase et al. |
| 6,528,553 B1 | * | 3/2003 | Komiya et al. ................ 522/96 |

FOREIGN PATENT DOCUMENTS

| | | |
|---|---|---|
| JP | 03-247671 | 11/1991 |
| JP | 08-113621 | 5/1996 |
| WO | WO 96/11965 | 4/1996 |
| WO | WO 99/26891 | 6/1999 |
| WO | WO 01/05724 A2 | 1/2001 |

OTHER PUBLICATIONS

Abstract of JP 59-170154.
Abstract of JP 08-113621.

* cited by examiner

Prior Art

Fig. 3

OPTICAL FIBER WITH CURED POLYMERIC COATING

CROSS REFERENCE TO RELATED APPLICATION

This application is a national phase application based on PCT/EP2002/011202, filed Oct. 7, 2002, the content of which is incorporated herein by reference.

BACKGROUND OF THE INVENTION

1. Field of the Invention

The present invention relates to an optical fiber with cured polymeric coating.

More particularly, the present invention relates to an optical fiber with at least one protective coating layer having a reduced attenuation of the transmitted signal.

Moreover, the present invention relates to an optical fiber with at least one protective coating layer obtained by curing a radiation curable composition comprising at least one ethylenically unsaturated polyurethane and at least one polyfunctional reactive diluent monomer and also to a radiation curable composition used therein.

Moreover, the present invention also relates to a method for controlling the attenuation losses caused by microbending on the signal transmitted by an optical fiber.

2. Description of the Related Art

Optical fibers commonly consist of a glass portion (typically with a diameter of about 125 µm), inside which the transmitted optical signal is confined, and of a coating, typically polymeric, arranged around the glass portion for substantially protective purposes. This protective coating typically comprises a first coating layer positioned directly onto the glass surface, known as the "primary coating" or "primary" for short, typically having a thickness of between about 25 µm and about 35 µm. In turn, this primary coating is generally covered with a second coating layer, known as the "secondary coating" or "secondary" for short, typically having a thickness of between about 10 µm and about 30 µm.

These polymeric coatings may be obtained from compositions comprising oligomers and monomers that are generally crosslinked by means of UV irradiation in the presence of a suitable photo-initiator. The two coating layers described above differ, inter alia, in terms of the modulus of elasticity value of the crosslinked material. As a matter of fact, one problem presented by the use of coating layers which are adhered to the glass surface of the optical fiber is caused by the difference in response to change in temperature between the glass and the coating layer which contributes to microbending attenuation of the fiber, especially when very low temperatures are encountered. To minimize this problem, coating layer possessing a very low modulus of elasticity value are selected to provide the above mentioned primary coating. Consequently, in order to provide the desired low modulus of elasticity value in the primary coating, one must sacrifice desired hardness and thoughness in the coating layer which contact the glass, so as the above mentioned secondary coating has to be applied on the top of said primary coating. The combination of said two layers of coating ensures adequate mechanical protection for the optical fiber.

The optical fiber thus composed usually has a total diameter of about 250 µm. However, for particular applications, this total diameter may also be smaller; in this case, a coating layer of reduced thickness is generally applied.

However, the necessity of using two coating layers having different characteristics may present some drawbacks. For example, problems due to the adhesion between the primary and the secondary coatings may arise: it is therefore necessary to select polymeric materials which are compatible among themselves but which have different modulus of elasticity values in order to both avoid microbending and to obtain an adequate mechanical protection.

In order to overcome said drawbacks, some efforts have been made in the prior art to obtain coating compositions which may be used as a single coating layer for optical fibers.

For example, U.S. Pat. No. 4,806,574 discloses an ultraviolet curable liquid coating composition which, when cured with ultraviolet light in the presence of an appropriate photoinitiator, provides a coating adapted for the coating of optical glass fiber. This coating composition comprises as the essential component, an acrylate-terminated polyurethane oligomer based on a polyfunctional core which is at least trifunctional and which supports one branch for each functionality in the core. According to the assertions made in the patent, said coating composition may be used as a topcoat as well as a coating directly applied onto the glass surface of the fiber in order to provide low tensile modulus at the low service temperatures which may be encountered so as to resist microbending. In one embodiment, said cured coating composition has a tensile modulus measured at +25° C. of 6,410 psi (about 44 MPa) and a tensile modulus measured at −40° C. of 96,971 psi (about 669 MPa).

U.S. Pat. No. 4,682,850 discloses an optical fiber having a core and an outer cladding. The cladding is coated with only a single ultraviolet-cured material having tensile modulus in the range of about 1,000 to about 10,000 psi (about 7 MPa to about 70 MPa). Preferably, the modulus is about 7,800 psi (about 53.8 MPa) measured at +25° C. and the material has a Shore A hardness of about 70 to about 75. According to the assertion made in the patent, said single coating satisfactorily protects the optical fiber, is easily applied to the fiber and minimizes microbending losses over a wide temperature range.

Other documents, such as, for example, U.S. Pat. Nos. 4,690,501, 4,690,502, 4,798,852, 4,932,750, disclose optical fiber coating compositions adapted either as primary coating or single coating, generally mentioning that these are suitable for minimizing microbending. Moreover, no specific value of the tensile modulus of the coating compositions measured either at +25° C. or at −40° C. is given in said documents.

In spite of the efforts to obtain suitable single coating layers, no satisfactory solution has however yet been found. In particular, whilst the above mentioned documents stress the need to avoid microbending at the low operating temperatures (i.e. −40° C.), most of these documents give no details about the mechanical properties of the used coating layers at such low temperatures. As a matter of fact, only U.S. Pat. No. 4,806,574 above cited discloses an example of a coating layer having a tensile modulus measured at −40° C. of about 668 MPa. Applicant has however observed that this value is still too high to significantly avoid the microbending phenomena.

In addition, Applicant has observed that the value of tensile modulus of said coating layer from the room temperature (+25° C.) to the low operating temperatures of −40° C., undergoes to an excessive variation, which variation in turn determines an excessive and uncontrolled variation of the microbending attenuation on the optical fiber.

Figure 3:
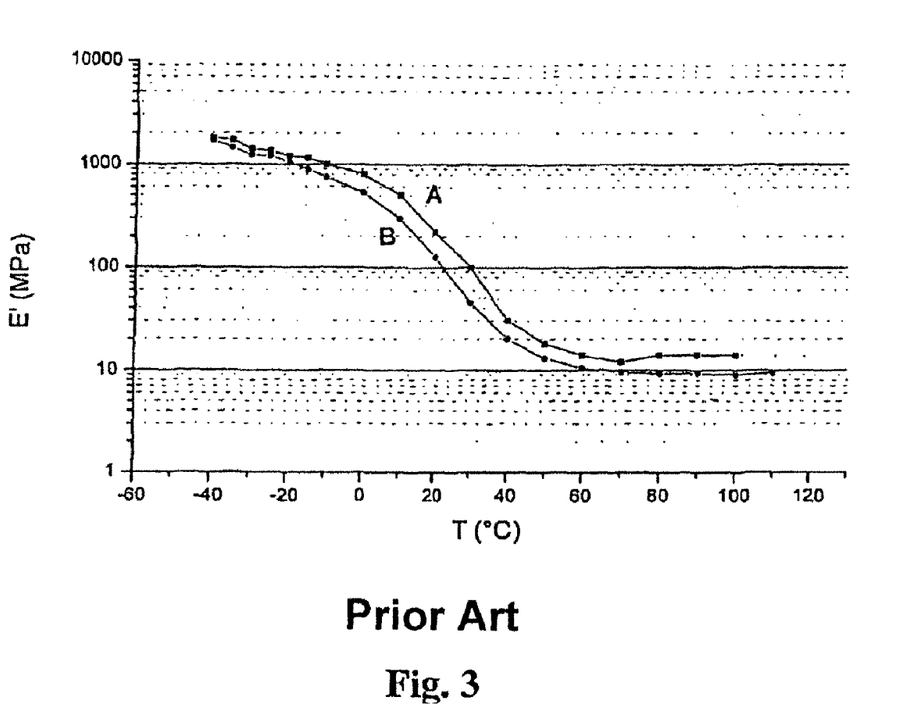
FIG. 3 shows a plot of the modulus of elasticity (E') vs. temperature (° C.) for (A) a commercial single coating DeSolite® 3471-3-7 (DSM) and (B) a single coating obtained by mixing 63% of commercial primary coating DeSolite® 3471-1-129 (DSM) and 37% of a commercial secondary coating DeSolite® 3471-2-136 (DSM).

Applicant has observed the behaviour of both (A) a commercial single coating DeSolite® 3471-3-7 (DSM) and of (B) a single coating obtained by mixing 63% of a commercial primary coating DeSolite® 3471-1-129 (DSM) and 37% of a commercial secondary coating DeSolite® 3471-2-136 (DSM) in order to have a modulus of elasticity value measured at +25° C. of about 60 MPa as suggested in U.S. Pat. No. 4,682,850 above cited: the two single coatings show however an excessively high increase of the modulus of elasticity value measured at −40° C. as showed in the enclosed FIG. 3 (in the abscissa is reported the temperature value (T) in ° C. as in the ordinate is reported the modulus of elasticity value (E') in MPa). Said modulus of elasticity value is tensile modulus and is measured using a DMTA apparatus (Dynamic Mechanical Thermal Analyser from Reometrics Inc.) operating as will be better described below.

The Applicant has further observed that the tensile modulus of the coating layer should be controlled over a broader range than the one indicated by the prior art (from −40° C. to +25° C.). As a matter of fact, under normal operative conditions, an optical fiber may be easily subjected to temperatures of about +40° C. and, in particular cases, up to about 60° C. Thus, it is important that the value of the tensile modulus of the coating layer remains sufficiently high also at such high operating temperatures in order to suitably protect the glass portion of the optical fiber.

SUMMARY OF THE INVENTION

Applicant has thus found that in order to have an acceptable value of microbending at the lower operating temperatures (−40° C.) and to avoid an excessive variation of the microbending attenuation, the modulus of elasticity value measured at −40° C. has to be relatively low (i.e. not higher than 500 MPa) and, in particular, that said modulus of elasticity value has to be relatively constant between −40° C. and +60° C. in order to minimize the variation of the microbending attenuation; of course, said relatively low modulus of elasticity value does not have to negatively affect the mechanical protection of the optical fiber. In addition, Applicant has found that the material of said protective coating layer should have a sufficiently high equilibrium modulus (i.e. higher than 5 MPa) in order to satisfactorily protect the optical fiber against mechanical stresses at high operating temperatures.

Applicant has found that a coating layer, in particular a single coating layer, for an optical fiber which is able to satisfactorily protect the optical fiber and to minimizes microbending attenuation over a wide temperature range, in particular in a temperature range of from −40° C. to +60° C., may be obtained by using a radiation curable composition comprising at least one ethylenically unsaturated polyurethane and at least one polyfunctional acrylate monomer.

In particular Applicant has found that a suitable radiation curable composition may contain at least one ethylenically unsaturated polyurethane having a glass transition temperature not higher than −40° C. and at least one polyfunctional reactive diluent monomer.

More in particular the Applicant has found that the use of the ethylenically unsaturated polyurethane having a low glass transition temperature affects the modulus of elasticity value at low temperatures of the cured composition, in particular allows to obtain a coating which does not show a too high increase in the modulus of elasticity value upon temperature decrease (e.g. the modulus of elasticity value is still relatively low at −40° C.). With regard to the use of the polyfunctional reactive diluent monomer, Applicant has found that its use may suitably modulate the modulus of elasticity value, in particular by maintaining it sufficiently high at the higher operating temperatures without excessively increasing its value at the lower operating temperatures.

According to a first aspect, the present invention relates to an optical fiber comprising:

a glass portion;
at least one protective coating layer directly disposed to surround said glass portion;

said protective coating layer having a modulus of elasticity value between −40° C. and +60° C. comprised between 5 MPa and 600 MPa, preferably not higher than 500 MPa, more preferably not higher than 450 MPa, much more preferably not higher than 300. Preferably, said modulus of elasticity value is not lower than 8 MPa, more preferably is higher than 12 MPa.

According to a preferred embodiment, said protective coating layer is disposed in contact with said glass portion.

According to a particular preferred embodiment, said optical fiber comprises a glass portion and a single protective coating layer which is disposed in contact with said glass portion.

According to a further aspect, the present invention relates to a method for controlling the attenuation losses caused by microbending on the signal transmitted by an optical fiber comprising an internal glass portion, which comprises providing at least one protective coating layer disposed to surround said glass portion, wherein said protective coating layer has a modulus of elasticity value between −40° C. and +60° C. comprised between 5 MPa and 600 MPa, preferably not higher than 500 MPa, more preferably not higher than 450 MPa, much more preferably not higher than 300. Preferably, said modulus of elasticity value is not lower than 8 MPa, more preferably is higher than 12 MPa.

In the present description and in the claims which follows, the term "optical fiber comprising a single protective coating layer" means that the mechanical protection of the optical fiber against external loads which may cause an increment of the microbending attenuation, is provided substantially by said single layer of a cured polymeric material. This definition thus includes, for example, also those embodiments where the optical fiber is coated by a single protective layer of a cured polymeric material directly applied on the glass portion which is in turn surrounded by an outer coating which provides no substantial contribution to the protection of the fiber against external loads such as, for example, an ink layer applied for identification purposes. Typically, in case of an outer layer being applied onto said single protective coating layer (e.g. an outer ink layer), the protective layer represents at least 80% of the total thickness of the polymeric coating of the optical fiber, preferably at least about 85%, more preferably about 90%±2%. For example, in case of a single protective coating having a thickness of about 60 μm, the thickness of an outer (ink) layer may be of about 5 μm-7 μm.

In addition, in the present description and in the claims which follows, the term "single protective coating layer" includes within is meaning, a coating of polymeric material applied either as a single layer or as a plurality of superposed layers.

According to a further preferred embodiment, the variation ($V_1$) between the modulus of elasticity value measured at −40° C. and the modulus of elasticity value measured at +60° C. of said protective coating layer, is not higher than 495 MPa, preferably not higher than 320 MPa, more preferably not higher than 150 MPa.

According to a further embodiment, said protective coating layer has an equilibrium modulus (E.M.) higher than 5 MPa.

According to a further preferred embodiment, said optical fiber has a microbending variation ($V_2$) between −40° C. and +60° C., measured by winding a 100 m length fiber with a tension of 5 g on a 300 mm diameter expandable metallic bobbin coated with rough material, not higher than 20 (dB/ km)/(g/mm), preferably not higher than 15 (dB/km)/(g/mm), more preferably not higher than 6 (dB/km)/(g/mm).

Said modulus of elasticity value and said equilibrium modulus are intended as "tensile modulus" and are measured using a DMTA apparatus (Dynamic Mechanical Thermal Analyser from Reometrics Inc.), at a frequency of 1 Hz and at a heating rate of 2° C./min.: further details regarding the analysis method will be described in the examples given hereinbelow.

Preferably, said protective coating layer has a refractive index at room temperature higher than the refractive index of the glass portion (about 1.46).

Preferably, said protective coating layer, in particular when it is used as a single protective coating layer, has a thickness comprises between 20 μm and 70 μm, more preferably between 30 μm and 60 μm.

According to a further preferred embodiment, said protective coating layer may be obtained by curing a radiation curable composition comprising:

(a) at least one ethylenically unsaturated polyurethane having a glass transition temperature ($T_g$) comprised between −40° C. and −100° C., preferably between −50° C. and −85° C.;

(b) at least one polyfunctional reactive diluent monomer.

Said glass transition temperature may be measured according to known techniques such as, for example, by Differential Scanning Calorimetry (DSC): further details regarding the DSC analysis will be described in the examples given hereinbelow.

According to a further preferred embodiment, said radiation curable composition also comprises at least one polymerization initiator (c).

According to a further preferred embodiment, said radiation curable composition also comprises at least one monofunctional reactive diluent monomer (d).

According to a further preferred embodiment, said radiation curable composition also comprises at least one adhesion promoter (e).

According to a further aspect, the present invention relates to a radiation curable composition comprising:

(a) from 50% by weight to 95% by weight, preferably from 75% by weight to 90% by weight, with respect to the total weight of said radiation curable composition, of at least one ethylenically unsaturated polyurethane having a glass transition temperature ($T_g$) comprised between −40° C. and −100° C., preferably between −50° C. and −85° C.;

(b) from 5% by weight to 50% by weight, preferably from 10% by weight to 35% by weight, with respect to the total weight of said radiation curable composition, of at least one polyfunctional reactive diluent monomer.

According to a further preferred embodiment, said radiation curable composition has a Brookfield viscosity comprised between 1000 m.Pa·sec and 4000 m.Pa·sec, preferably comprised between 2000 m.Pa·sec and 3000 m.Pa·sec, in a temperature range of from 20° C. to 80° C.

Said Brookfield viscosity is measured using a viscometer of Brookfield type, model DV-III, equipped with a configuration 29.

According to a preferred embodiment, the ethylenically unsaturated polyurethane (a) is obtained by reacting the following compounds:

(A) at least one polyol compound comprising a structural unit represented by the following formula (I):

wherein n is an integer comprised from 0 to 4 inclusive; $R_1$, $R_2$, $R_3$, $R_4$, $R_5$ and $R_6$, which may be equal or different from each other, represent a hydrogen atom or a $C_1$-$C_4$ alkyl group;

(B) at least one polyisocyanate compound; and (C) at least one (meth)acrylate compound containing at least one hydroxyl group.

Polyol type compounds (A) which may be useful according to the present invention, may contain any other structural units so long as the compound has at least the structural unit having formula (I).

Specific examples of structural unit having formula (I) are the following:

Polyol type compounds (A) particularly preferred according to the present invention are the following: compounds obtained by polymerizing at least one compound selected from ethylene glycol, polyethylene glycol, propylene glycol, polypropylene glycol, tetramethylene glycol, 2-alkyl-1,4-butanediol and 3-alkyl-1,4-butanediol; compounds obtained by ring-opening polymerization of 2-alkyl-tetrahydrofuran or 3-alkyl-tetrahydrofuran; compounds obtained by copolymerization of 2-alkyl-tetrahydrofuran, 3-alkyl-tetrahydrofuran or 2-alkyl-1,4-butanediol, with a cyclic ether such as ethylene oxide, propylene oxide and tetrahydrofuran; and the like, or mixtures thereof. When the polyol type compound (A) includes a structural unit other than the structural unit having formula (I), preferably, the structural unit having formula (I) is present in an amount of at least 5% by weight, more preferably of at least 10% by weight with respect to the weight of the compound (A). More preferably, the polyol type compound (A) is selected from polytetramethylene glycol, polypropylene glycol, copolymer of tetramethylene glycol, or polypropylene glycol.

Preferably, said polyol type compound (A) has an average (number-average) molecular weight of between 200 and 6,000, preferably of between 400 and 4,000.

Said average (number-average) molecular weight may be determined by known techniques such as, for example, by gel permeation chromatography (GPC).

Other polyol type compounds (A') which do not have the structural unit having formula (I), may be advantageously used, either as such or in mixture with at least one polyol type compound (A). Alternatively, said polyol type compounds (A') may be co-polymerized with at least one polyol type compound (A).

Specific examples of said other polyol type compounds (A') which may be used according to the present invention, are the following: polybutadiene with a terminal hydroxyl group, hydrogenated polybutadiene with a terminal hydroxyl group, polyisobutylene polyol, 1,6-hexanediol, neopentyl glycol, 1,4-cyclohexane dimethanol, bisphenol A, bisphenol F, alkylene oxide adducts of bisphenol A, alkylene oxide adducts of bisphenol F, dimethylolized compound of dicyclopentadiene, polyester diols, polycaprolactone diols, polycarbonate diols, and the like, or mixture thereof. Preferably, said other polyol type compounds (A') have an average (number-average) molecular weight of between 200 and 8,000, preferably from 400 to 4,000.

Polyisocyanate compounds (B) which may be used according to the present invention, may be selected from: polyisocyanates of 2,4-tolylenediisocyanate, 2,6-tolylenediisocyanate, 1,3-xylenediisocyanate, 1,4-xylenediisocyanate, 1,5-naphthalenediisocyanate, m-phenylenediisocyanate, p-phenylenediisocyanate, 3,3'-dimethyl-4,4'-diphenylmethanediisocyanate, 4,4'-diphenylmethanediisocyanate, 3,3'-dimethyl-phenylenediisocyanate, 4,4'-biphenylenediisocyanate, 1,6-hexa-methylenediisocyanate, isophorone-diisocyanate, methylenebis(4-cyclohexylisocyanate), 2,2,4-trimethylhexamethylenediisocyanate, 2,4,4-trimethylhexamethylenediisocyanate, 1,4-hexamethylenediisocyanate, bis(2-isocyanateethyl)-fumarate, 6-isopropyl-1,3-phenyldiisocyanate, 4-diphenylpropaneisocyanate, lysinediisocyanate, and the like, or mixtures thereof. 2,4-Tolylenediisocyanate and 2,6-tolylenediisocyanate, isophoronediisocyanate, are preferred.

(Meth)acrylate compounds having at least one hydroxyl group (C) which may be used according to the present invention, may be selected from: 2-hydroxyethyl (meth)acrylate, 2-hydroxypropyl (meth)-acrylate, 2-hydroxy-3-phenyloxypropyl (meth)-acrylate, propanediol (meth)acrylate, 1,4-butanediol mono(meth)acrylate, 2-hydroxyalkyl (meth)acryloyl phosphate, 4-hydroxycyclohexyl (meth)acrylate, 1,6-hexanediol mono(meth)acrylate, neopentylglycol mono (meth)acrylate, trimethylolpropane di(meth)-acrylate, trimethylolethane di(meth)acrylate, pentaerythrithol tri (meth)acrylate, dipenta-erythritol penta(meth)acrylate, (meth)acrylates represented by the following formulae (II) or (III):

wherein $R_5$ represents a hydrogen atom or a methyl group and n is an integer of from 1 to 15 inclusive; and the like, or mixtures thereof. 2-Hydroxyethyl acrylate and 2-hydroxypropyl acrylate are preferred.

In addition, compound obtained by addition reaction of a glycidyl group containing compound such as, for example, alkyl glycidylether, aryl glycidylether and glycidyl(meth) acrylate with (meth)acrylic acid, may be advantageously used.

As disclosed above, the ethylenically unsaturated polyurethane (a) used according to the present invention, may be obtained by reacting the above-mentioned polyol compound (A) or (A'), the polyisocyanate compound (B) and the (meth) acrylate compound containing at least one hydroxyl group (C). More in particular, it can be obtained by reacting the isocyanate group of said polyisocyanate compound (B) with the hydroxyl group of said polyol compound (A) or (A') and of said (meth)acrylate compound containing at least one hydroxyl group (C).

Said reaction may be carried out by charging polyol compound (A) or (A'), polyisocyanate compound (B) and (meth) acrylate compound (C) altogether. Alternatively, it can be carried out by first reacting polyol compound (A) or (A') with polyisocyanate compound (B) and then reacting the resulting compound with (meth)acrylate compound having at least one hydroxyl group (C). More in particular, said latter method comprises the reaction of the hydroxyl group of polyol compound (A) or (A') with the isocyanate group of polyisocyanate compound (B) under operating conditions such that an excessive amount of isocyanate may be present with respect to the hydroxyl group in the reaction system, and then reacting the remaining isocyanate group with the hydroxyl group of (meth)acrylate compound (C). Furthermore, the ethylenically unsaturated polyurethane (a) may also be obtained by first reacting polyisocyanate compound (B) with (meth)acrylate compound (C) and then reacting polyol compound (A) or (A') with the resulting product, i.e. by reacting the hydroxyl group of (meth)acrylayte compound (C) with the isocyanate group of polyisocyanate compound (B) under operating conditions such that an excessive amount of isocyanate group may be present with respect to the hydroxyl group in the reaction system and then reacting the remaining isocyanate group with hydroxyl group of polyol compound (A) or (A').

The proportion of the polyol compound (A) or (A'), polyisocyanate compound (B) and (meth)acrylate compound (C) to be used is preferably determined such that the isocyanate group contained in the polyisocyanate compound (B) and the hydroxyl group contained in the (meth)acrylate compound (C) may be from 1.1 to 2 equivalent and from 0.5 to 1.5, respectively, per 1 equivalent of the hydroxyl group contained in the polyol compound (A) or (A').

A urethanization catalyst such as, for example, copper naphthenate, cobalt naphthenate, zinc naphthenate, dibutyltin dilaurate, triethylamine, and the like, is usually used in the above reaction in an amount of from 0.01 parts by weight to 1.0 part by weight per 100 parts by weight of the total amount of the raw materials. The reaction temperature is in the range of from 10° C. to 90° C., preferably of from 30° C. to 80° C.

Ethylenically unsaturated polyurethanes (a) which may be used according to the present invention are commercially available, for example, under the brand names Ebecryl® 230 from UCB Chemical or BR® 304 from Bomar Specialties or may be synthesized according to the process disclosed in the following examples.

The radiation curable composition according to the present invention, may also comprise other radiation curable polymers which may be selected from: ethylenically unsaturated polyurethane different from the ethylenically unsaturated polyurethane (A) or (A'), polyester (meth)acrylates, epoxy (meth)acrylates, polyamide (meth)acrylates, diene type polymers containing (meth)acryloxy groups, siloxane polymers containing (meth)acryloxy groups, and the like, or mixtures thereof.

According to a preferred embodiment, the ethylenically unsaturated polyurethane (a) does not crystallize during cooling up to −20° C. In the case in which the ethylenically unsaturated polyurethane (a) crystallize during cooling, the application of the coating layer to the optical fiber may be carried out operating at a temperature at least 10° C. higher than the melting temperature of said ethylenically unsaturated polyurethane (a) and avoiding any cooling during the application.

According to a preferred embodiment, the polyfunctional reactive diluent monomer (b) may be selected from monomers containing at least two reactive functional groups which are able to react with the reactive functional groups contained in the ethylenically unsaturated polyurethane (a). Preferably, said at least two reactive functional groups are (meth)acrylates groups.

Specific examples of polyfunctional reactive diluent monomers (b) which may be used according to the present invention are: ethylene glycol di(meth)acrylate, tetraethylene glycol di(meth)-acrylate, propanediol di(meth)acrylate, 1,4-butanediol di(meth)acrylate, trimethylolpropane di(meth)acrylate, trimethylolpropane tri(meth)-acrylate, neopently glycol di(meth)acrylate, 1,6-hexanediol di(meth)acrylate, 1,6-hexamethylene-dihydroxy di(meth)acrylate, polyethylene glycol di(meth)acrylate, polypropylene glycol di(meth) acrylate, hydroxypivalic acid neopentyl glycol ester di(meth) acrylate, trimethylolpropane tri(meth)acrylate, trimethylolpropanetrioxyethyl (meth)acrylate, tricyclodecanedimethanol di(meth)-acrylate, dicyclopentadiene di(meth)acrylate, pentaerythritol tri(meth)acrylate, pentaerythritol tetra(meth)acrylate, pentaerythritol trioxyethyl (meth)acrylate, pentaerythritol tetraoxyethyl (meth)acrylate, di(meth)acrylate of a diol such as the addition compound of ethylene oxide or propylene oxide with bisphenol A, hydrogenated bisphenol A glycidyl ether of bisphenol A, and the like, or mixtures thereof. 1,6-Hexane diol diacrylate, pentaerythritol triacrylate, and a mixture of pentaerythritol triacrylate and pentaerythritol tetraacrylate, are preferred.

Polyfunctional reactive diluent monomers (b) which may be used according to the present invention are commercially available such as, for example, the mixture of pentaerythritol triacrylate and pentaerythritol tetracrylate (PETIA), or the 1,6-hexanediol diacrylate (HDDA) which are commercialized by, for example, UCB Chemicals.

As stated above, the radiation curable composition according to the present invention, also comprises at least one polymerization initiator (c). The radiation may be carried out by means of ultraviolets rays or of ionizing radiations.

Specific examples of polymerization initiators (c) which may be may used according to the present invention, may be selected from: benzophenone, benzoin, benzoinisobutyl ether, benzil, benzoinethyl ether, 2,2-dimethoxy-2-phenylacetophenone, xanthone, fluorenone, 4-chlorobenzophenone, triphenylamine, carbazole, 3-methylacetophenone, 4,4'-dimethoxybenzophenone, 4,4,'-diaminobenzophenone, Michler's ketone, benzoin propyl ether, acetophenone diethyl ketal, benzoin ethyl ether, 1-hydroxycyclohexylphenyl ketone, 2-hydroxy-2-methylpropiophenone (such as Darocure® 1173 or Irgacure® 819 manufactured by Ciba Specialty Chemicals), 4'-isopropyl-2-hydroxy-2-methyl-propiophenone, α, α-dichloro-4-phenoxyacetophenone, benzyl dimethyl ketal, 2,2-diethoxyacetophenone chlorothioxantone, 2-isopropylthioxantone, diethylthioxantone, 3,3-dimethyl-4-methoxybenzophenone, 2-methyl-1-[4-(methylthio) phenyl]-2-morpholinopropanon,
α-hydroxycyclohexylphenyl ketone (such as Irgacure® 184 manufactured by Ciba Specialty Chemicals), 2,4,6-trimethylbenzoyldiphenylphosphine oxide (such as Lucirin® TPO manufactured by Basf), and the like, or mixtures thereof. α-Hydroxycyclohexylphenyl ketone (such as Irgacure® 184 manufactured by Ciba Specialty Chemicals), 2-hydroxy-2-methylpropiophenone (such as Darocure® 1173 or Irgacure® 819 manufactured by Ciba Specialty Chemicals), and 2,4,6-trimethylbenzoyldiphenyl-phosphine oxide (such as Lucirin® TPO manufactured by Basf), are preferred.

In addition to the polymerization initiator (c), if necessary, at least one photo-sensitizer (f) may be added to the radiation curable composition according to the present invention.

The photo-sensitizer (f) may be selected from: amines, ureas, phosphorus compounds, sulfur compounds, nitrils, and the like, or mixtures thereof. Specific example of photo-sensitizers which may be used according to the present invention are: triethylamine, diethylaminoethyl methacrylate, N-methyldiethanolamine, 4-dimethylaminoethyl benzoate, 4-dimethylaminoisoamyl benzoate, 4,4'-bisdiethylaminobenzophenone, Ubecryl® P104 (a high molecular tertiary amine compound manufactured by UCB Chemicals), and the like, or mixtures thereof.

Said polymerization initiator (c) and said photo-sensitizer (f) may be present in the radiation curable composition according to the present invention in a total amount of from 0.01% by weight to 10% by weight, preferably from 0.05% by weight to 8% by weight, with respect to the total weight of said radiation curable composition.

When the radiation curable composition according to the present invention is crosslinked using ionizing radiations the polymerization initiator (c) is not present.

As stated above, the radiation curable composition according to the present invention also comprises at least one monofunctional reactive diluent monomer (d).

According to a preferred embodiment, the monofunctional reactive diluent monomer (d) may be selected from monomers containing one reactive functional group which is capable of reacting with the reactive functional groups contained in the ethylenically unsaturated polyurethane (a). Preferably, said reactive functional group is a (meth)acrylate group.

Specific example of monofunctional reactive diluent monomers (d) which may be used according to the present invention are: 2-hydroxyethyl (meth)acrylate; 2-hydroxypropyl (meth)acrylate; 2-ethylhexyl (meth)acrylate; butoxyethyl (meth)acrylate; tetrahydrofurfuryl (meth)acrylate; linear or branched alkyl (meth)acrylates such as, for example, butyl (meth)acrylate, octyl-(meth)acrylate, decyl (meth)acrylate, tridecyl (meth)acrylate, stearyl (meth)acrylate, lauryl (meth) acrylate, isodecyl (meth)acrylate); n-hexyl (meth)acrylate; cyclohexyl (meth)acrylate; isobornyl (meth)acrylate; ethoxylated alkyl (meth)acrylates such as, for example, methoxyethyl (meth)acrylate, ethoxyethyl (meth)acrylate, butoxyethyl (meth)-acrylate, 2-(2-ethoxyethoxy)ethyl (meth) acrylate; dicyclopentenyl (meth)acrylate; diethylene glycol (meth)acrylate; ethoxydiethylene glycol (meth)acrylate; benzyl (meth)acrylate; polyethylene glycol(meth)acrylate; polypropylene glycol (meth)acrylate; methoxypolyethylene glycol (meth)acrylate; methoxypolypropylene glycol (meth) acrylate;2-phenoxyethyl (meth)acrylate; phenoxypolyethylene glycol (meth)acrylate; alkylphenoxyethyl (meth)acrylate such as, for example, nonylphenoxyethyl (meth)acrylate; alkylphenoxypolyalkylene glycol (meth)acrylate; 2-hydroxy-3-phenyloxypropyl (meth)acrylate;tetra-hydrofurfuryloxypropylalkylene glycol (meth)-acrylate; dicyclopentenyloxypolyalkylene glycol (meth)acrylate; 2-hydroxyalkyl (meth)acryloyl phosphate; polyfluoroalkyl (meth)acrylate; N-vinyl pyrrolidone; N-vinyl caprolactam; diacetone (meth)

acrylamide; isobutoxymethyl (meth)acrylamide; N,N-dimethyl acrylamide; t-octyl (meth)acrylamide; dialkylaminoethyl (meth)acrylate; (meth)acryloyl-morpholine; and the like, or mixtures thereof. Isobornyl acrylate, 2-phenoxyethyl acrylate, nonylphenoxyethyl acrylate, $C_8$-$C_{13}$ alkyl acrylates, lauryl acrylate, isodecyl acrylate, are preferred. Particularly preferred, because of the low glass transition temperature ($T_g$) of their homopolymer, are: 2-phenoxyethyl acrylate, nonylphenoxyethyl acrylate, $C_8$-$C_{13}$ alkyl acrylates, lauryl acrylate, isodecyl acrylate.

Said monofunctional reactive diluent monomer (d) may be present in the radiation curable composition according to the present invention in an amount of from 3% by weight to 25% by weight, preferably from 5% by weight to 20% by weight, with respect to the total weight of said radiation curable composition. It has to be noted that, in the case the glass transition temperature ($T_g$) of the homopolymer of said monofunctional reactive monomer is relatively high (e.g. above about 90° C.), the amount thereof is preferably not higher than about 20% by weight with respect to the total weight of said radiation curable composition: as a matter of fact, a higher amount of said monofunctional reactive diluent monomer (d) may cause an excessively hardening at low temperatures of the protective coating layer.

Monofunctional reactive diluent monomers (d) which may be used according to the present invention are commercially available such as, for example, the isobornyl acrylate (IBOA), the mixture of octyl acrylate and decyl acrylate (ODA), or the 2-phenoxyethyl acrylate (PEA) which are commercialized by, for example, UCB Chemicals.

As stated above, the radiation curable composition according to the present invention may also comprise at least one adhesion promoter (e).

According to a preferred embodiment, the adhesion promoter (e) is an organo-functional silane.

For the purpose of the present description and the claims, the term "organo-functional silane" is intended to indicate a silyl compound with functional groups that facilitate the chemical or physical bonding between the glass surface and the silane, which ultimately results in increased or enhanced adhesion between the coating and the glass fiber.

Specific examples of organo-functional silanes that may be used according to the present invention are: octyltriethoxysilane, methyltriethoxysilane, methyltrimethoxysilane, tris(3-trimethoxysilyl-propyl)isocyanurate, vinyltriethoxysilane, vinyltri-methoxysilane, vinyl-tris(2-methoxyethoxy)silane, vinylmethyldimethoxysilane, γ-methacryloxypropyl-trimethoxysilane, β-(3,4-epoxycyclohexyl)ethyltri-methoxysilane, γ-glycidoxypropyltrimethoxysilane, γ-mercaptopropyltrimethoxysilane, organo-modified poly-dimethylsiloxane, γ-ureidopropyltrialkoxy-silane, γ-ureidopropyltrimethoxysilane, γ-isocyanate-propyltriethoxysilane, and the like, or mixtures thereof. γ-Mercaptopropyltrimethoxysilane and γ-methacryloxy-propyltrimethoxysilane, are particularly preferred.

Other examples of organo-functional silanes that may be used in the present invention may be identified, for example, by the following structural formula (IV):

(R)$_3$Si—C$_n$H$_{2n}$—X        (IV)

wherein the groups R, which may be identical to or different from each other, are chosen from: alkyl, alkoxy or aryloxy groups or from halogen atoms, on condition that at least one of the groups R is an alkoxy or aryloxy group; n is an integer between 1 and 6 inclusive; X is a group selected from: nitrous, mercapto, epoxide, vinyl, imido, chloro, —(S)$_m$C$_n$H$_{2n}$—Si—(R)$_3$ wherein m and n are integers between 1 and 6 inclusive and the groups R are defined as above. Among these, bis-(3-tri-methoxysilylpropyl)disulfane and bis(3-triethoxy-silyl-propyl)disulfane, are particularly preferred.

Adhesion promoters (e) which may be used in the present invention are commercially available, for example, under the brand name Dynasylan® MTMO and Dynasylan® MEMO from Degussa and Si® 266 from Degussa-Hüls.

The adhesion promoter (e) is preferably present in the radiation curable composition according to the present invention in an amount of from 0.1% by weight to 2.5% by weight, more preferably of from 0.3% by weight to 1.5% by weight, with respect to the total weight of said radiation curable composition.

In addition, conventional additives may be added for the purpose of improving the fundamental characteristics of the abovementioned radiation curable compositions. For example, solvents, plasticizers, surfactants capable of improving the wettability ("wetting") of the coating on the glass portion of the optical fiber, devolatilizing agents, rheological agents, antioxidants, UV stabilizers capable of not interfering with the curing operations, may be added. Said conventional additives may be present in the abovementioned radiation curable composition in an amount of from 0.1% by weight to 20% by weight, preferably of from 0.5% by weight to 10% by weight, with respect to the total weight of said radiation curable composition.

When one and the same cable internally contains several optical fibers, the operator must be able to identify the different fibers with certainty, hence it is convenient to colour the various fibers with different identifying colours. Accordingly, the coating composition may further comprise conventional dyes and/or pigments for providing the desired colours of the material.

Instead of colouring the protective coating layer, the optical fiber according to the present invention, may be colour-identified by surrounding the protective coating layer with an additional coloured polymer layer, commonly known as "ink", having a thickness typically between about 2 μm and 10 μm, preferably of about 5 μm and 8 μm. Examples of said coloured polymer layer are commercialized under the tradename of Cablelite® by DSM.

BRIEF DESCRIPTION OF THE DRAWINGS

The present invention may be understood more clearly with reference to the following attached figures.

DETAILED DESCRIPTION OF THE INVENTION

Figure 1:
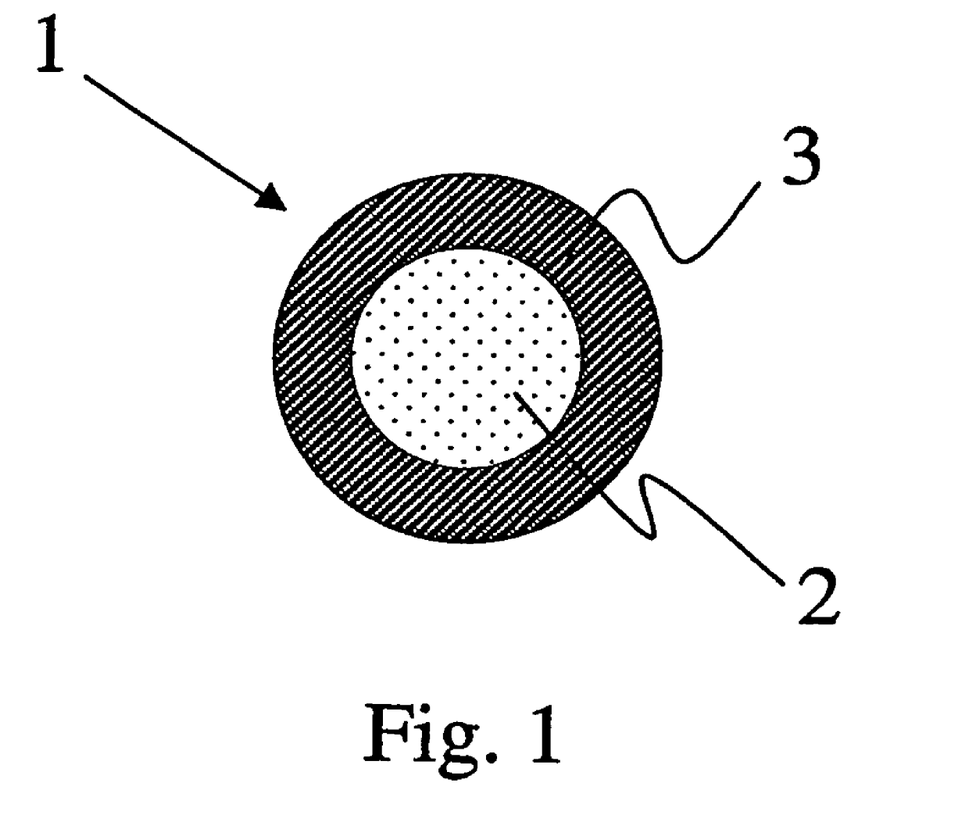
FIG. 1: is a cross section of an optical fiber according to the present invention.

FIG. 1 shows an optical fiber (1) according to the present invention, comprising a glass portion (2) which includes a core and a cladding, the core having a higher refraction index than the cladding, which is covered by a protective coating layer (3).

Figure 2:
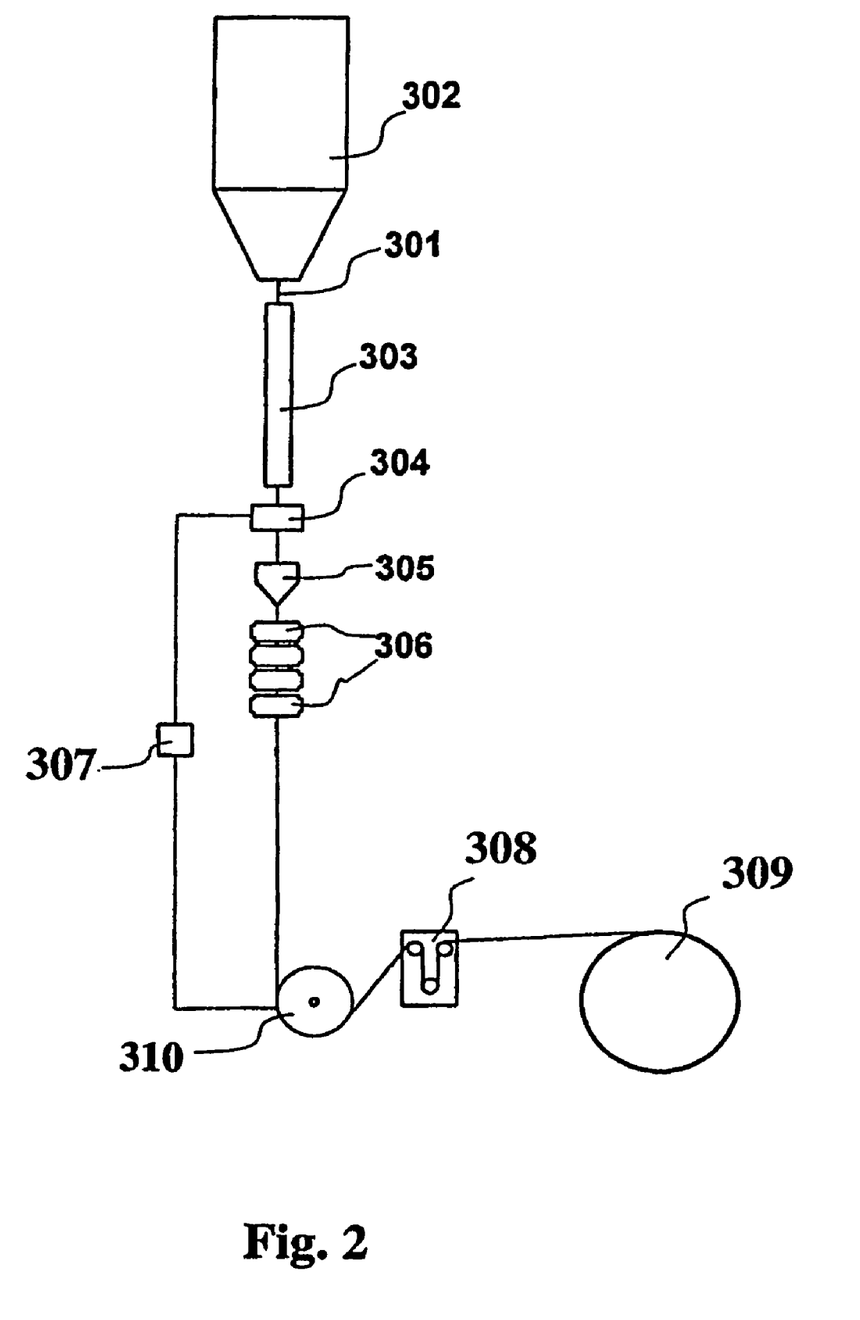
FIG. 2: is the general scheme of a system (drawing tower) for producing an optical fiber according to the present invention.

An optical fiber according to the present invention may be produced according to the usual drawing techniques, using, for example, a system such as the one schematically illustrated in FIG. 2.

This system, commonly known as a "drawing tower", typically comprises a furnace (302) inside which is placed a glass optical preform to be drawn. The bottom part of said preform is heated to the softening point and drawn into an optical fiber (301). The fiber is then cooled, preferably to a temperature of not less than 60° C., preferably in a suitable cooling tube (303) of the type described, for example, in patent application WO 99/26891, and passed through a diameter measurement device (304). This device is connected by means of a microprocessor (307) to a pulley (310) which regulates the drawing speed; in the event of any variation in the diameter of the fiber, the microprocessor (307) acts to regulate the rotational speed of the pulley (310), so as to keep the diameter of the optical fiber constant. Then, the fiber passes through a coating layer applicator (305), containing the coating composition in liquid form, and is covered with this composition to a thickness of about 60 μm. The coated fiber is then passed through a UV oven (or a series of ovens) (306) wherein the coating layer is cured.

Alternatively, the protective coating layer may be applied in two subsequent steps. In this case, the fiber is first covered with a first coating layer of about 30 μm thickness, subsequently the coated fiber is passed through a second applicator (not shown in FIG. 2), wherein it is coated with a second coating layer of about 30 μm thickness of the same material and then crosslinked in the relative UV oven (or series of ovens) (not shown in FIG. 2). In this case, if desired, only the coating composition of the second coating layer may advantageously contain dye and/or pigment for providing the desired identification of the optical fiber.

In the case in which it is necessary to apply an outer coloured coating layer, the optical fiber passes through an ink applicator and a respective UV oven (not shown in FIG. 2).

Subsequently to the coating and to the curing of this coating layer, the fiber may optionally be caused to pass through a device capable of giving a predetermined torsion to this fiber, for example of the type described in international patent application WO 99/67180, for the purpose of reducing the PMD ("Polarization Mode Dispersion") value of this fiber. The pulley (310) placed downstream of the devices illustrated previously controls the drawing speed of the fiber. After this drawing pulley, the fiber passes through a device (308) capable of controlling the tension of the fiber, of the type described, for example, in patent application EP 1 112 979, and is finally collected on a reel (309).

An optical fiber thus produced may be used in the production of optical cables. The fiber may be used either as such or in the form of ribbons comprising several fibers combined together by means of a common coating.

The present invention will be further illustrated hereinbelow by means of a number of implementation examples that are provided purely as a guide and are non-limiting on the invention.

EXAMPLES 1-9

Nine coating compositions were prepared. The amounts of the components for each composition (% by weight), are given in Table 1.

TABLE 1

| | EXAMPLE | | | | | | | | |
|---|---|---|---|---|---|---|---|---|---|
| | 1 | 2 | 3 (*) | 4 | 5 | 6 | 7 | 8 | 9 |
| HEA-IPDI-PolyTHF 2900-IPDI-HEA (a) | 58.5 | — | — | — | — | — | — | — | — |
| Ebecryl ® 230 (a) | — | 83.0 | — | — | — | — | — | — | — |
| BR ® 304 (a) | — | — | — | 63.5 | 58.5 | 83.0 | 73.3 | 73.3 | 73.3 |
| HEA-IPDI-(PolyTHF 650-TDI)$_2$-HEA (a) | — | — | 65 | — | — | — | — | — | — |
| PETIA (b) | — | 14.6 | — | 14.6 | — | 14.6 | 14.6 | 14.6 | 24.3 |
| HDDA (b) | 29.4 | — | 24.4 | — | 29.4 | — | — | — | — |
| IBOA (d) | — | — | — | 19.5 | — | — | 9.7 | — | — |
| ODA (d) | 9.7 | — | 9.7 | — | 9.7 | — | — | — | — |
| PEA (d) | — | — | — | — | — | — | — | 9.7 | — |
| Irgacure ® 184 (c) | 0.94 | 0.94 | 0.94 | 0.94 | 0.94 | 0.94 | 0.94 | 0.94 | 0.94 |
| Dynasylan ® MTMO (e) | 1.46 | 1.46 | 1.46 | 1.46 | 1.46 | 1.46 | 1.46 | 1.46 | 1.46 |

(*): comparative;

HEA-IPDI-PolyTHF 2900-IPDI-HEA (oligomer): the oligomer was obtained as follows: a three-necks flask was charged with 0.024 moles of polytetramethylenglycol having an average (number-average) molecular weight of 2,900 (PolyTHF), 0.048 moles of isophoronediisocyanate (IPDI) which are slowly added dropwise, and 150 ppm of dibutyltin dilaurate: the obtained mixture was maintained under mechanical stirring, at 55° C., under inert athmosphere (argon), for 2 hours. Subsequently, 0.048 moles of hydroxyethylacrylate (HEA) were added slowly and the mixture was maintained under mechanical stirring, at 55° C., under inert athmosphere (argon), for 18 hours obtaining the desired oligomer.
Ebecryl ® 230 (oligomer): aliphatic polyether urethane diacrylate having an average (number-average) molecular weight of 5,000, from UCB Chemicals;
BR ® 304 (oligomer): aromatic polyether urethane diacrylate having an average (number-average) molecular weight higher than 4,000, from Bomar Specialty;
HEA-IPDI-(PolyTHF 650-TDI)$_2$-HEA (oligomer): the oligomer was obtained as follows: a three-necks flask was charged with 0.024 moles of polytetramethylenglycol having an average (number-average) molecular weight of 650 (PolyTHF), 0.048 moles of isophoronediisocyanate (IPDI) which are slowly added dropwise, and 150 ppm of dibutyltin dilaurate: the obtained mixture was maintained under mechanical stirring, at 55° C., under inert athmosphere (argon), for 2 hours. Subsequently, 0.048 moles of hydroxyethylacrylate (HEA) were added slowly and the mixture was maintained under mechanical stirring, at 55° C., under inert athmosphere (argon), for 18 hours obtaining the desired oligomer.
PETIA (polyfunctional monomer): mixture of pentaerythritol triacrylate and pentaerythritol tetracrylate, from UCB Chemicals;
HDDA (polyfunctional monomer): 1,6-hexanediol diacrylate from UCB Chemicals;
IBOA (monofunctional monomer): isobornyl acrylate from UCB Chemicals;
ODA (monofunctional monomer): mixture of octyl acrylate and decyl acrylate from UCB Chemicals;
PEA (monofunctional monomer): 2-phenoxyethyl acrylate from UCB Chemicals;
Irgacure ® 184 (polymerization initiator): α-hydroxycyclohexylphenyl ketone from Ciba Specialties;
Dynasylan ® MTMO (adhesion promoter): gamma-mercaptopropyltrimethoxysilane from Degussa.

The above reported oligomers (a) were subjected to Differential Scanning Calorimetry (DSC) analysis in order to measure both the glass transition temperatures ($T_g$) and the melting temperature ($T_m$): the obtained results are given in Table 2. The DSC analysis was conducted as follows.

Preliminary Steps:
temperature scan: heating from +25° C. to +80° C. with a heating rate of 10° C./min;
isothermal: holding for 5 min at +80° C.;
temperature scan: cooling from +80° C. to +25° C. with a cooling rate of 10° C./min.

The above disclosed preliminary steps are necessary to erase the thermal hystory if the oligomer has a melting temperature.

First Step:
temperature scan: cooling from +25° C. to −100° C. with a cooling rate of 10° C./min.

Second Step:
isothermal: holding for 2 min at −100° C.

Third Step:
temperature scan: heating from −100° C. to +80° C. with a heating rate of 10° C./min.

TABLE 2

| | HEA-IPDI-PolyTHF 2900-IPDI-HEA | Ebecryl® 230 | BR 304 | HEA-IPDI-(PolyTHF 650-TDI)$_2$-HEA |
|---|---|---|---|---|
| $T_g$ (° C.) | −71.2 | −54.5 | −61.0 | −28.0 |
| ($T_m$) (° C.) | +25° C. | — | — | — |

The above reported polyfunctional monomers (b) and monofunctional monomer (d) were subjected to Differential Scanning Calorimetry (DSC) analysis in order to measure the glass transition temperatures ($T_g$) of their homopolymer: the DSC analysis was conducted as disclosed in a Sartomer Application Bulletin, No. 4013, published on October, 1999. The obtained results are given in Table 3.

TABLE 3

| | PETIA | HDDA | IBOA | ODA | PEA |
|---|---|---|---|---|---|
| $T_g$ (° C.) | +103 | +43 | +88 | −30 | +5 |

The components given in Table 1, were placed in a 100 ml becker and were kept under mechanical stirring for 2 hours at 40° C. Subsequently, the compositions were left to stand for at least 12 hours, at room temperature, so as to obtain a homogeneous composition free of bubbles.

EXAMPLE 12

Mechanical and Chemical-physical Analysis

The compositions of Examples 1-9 were subjected to the following mechanical and chemical-physical analyses.

As a comparison:

(A): a commercial single coating DeSolite® 3471-3-7 (DSM) (Example 10); and (B): a mixture of 63% of commercial primary coating DeSolite® 3471-1-129 (DSM) and 37% of a commercial secondary coating DeSolite® 3471-2-136 (DSM) (Example 11);

were subjected to the same mechanical analyses.

Viscosity

The temperatures at which the non-cured compositions obtained according to Examples 1-9 reach a Brookfield viscosity of 2000 m.Pa·sec were determined by using a viscometer of Brookfield type, model DV-III, equipped with a configuration 29, operating at 150 rpm. The obtained results are given in Table 3.

Modulus of Elasticity Value

Films were obtained from the abovementioned compositions by working as follows. A film having 120 mm×150 mm dimensions and 70 μm in thickness, was spread onto a glass plate using the "Doctor Blade" filmograph at a speed of 2 m per minute; the curing of the film was carried out using a Fusion UV curing System device, model F600 and lamp with spectrum D, applying a UV dose of 1.5 J/cm$^2$, operating in inert nitrogen atmosphere. At the end of the curing, the films were removed from the glass plate.

The films thus obtained were conditioned for 24 hours, at 25° C. and at 50% relative humidity, and were then subjected to measurement of the tensile modulus of elasticity values by means of a DMTA (Dynamic Mechanical Thermal Analyser from Reometrics Inc.), at a frequency of 1 Hz and at a heating rate of 2° C./min over the temperature range between −60° C. and 120° C. The lowest modulus of elasticity value measured as disclosed above, was taken as the equilibrium modulus. The results obtained are given in Table 4.

TABLE 4

| | EXAMPLE | | | | | | | | | | |
|---|---|---|---|---|---|---|---|---|---|---|---|
| | 1 | 2 | 3 (*) | 4 | 5 | 6 | 7 | 8 | 9 | 10 (*) | 11 (*) |
| Brookfield viscosity: 2000 mPa/sec (temperature: ° C.) | | | | | | | | | | | |
| | 40 | 56 | 45 | 35 | 50 | 51 | 42 | 36 | 48 | — | — |
| DMTA ANALYSIS (MPa) | | | | | | | | | | | |
| −40° C. | 300 | 390 | 1510 | 449 | 254 | 113 | 237 | 104 | 253 | 1800 | 1600 |
| +25° C. | 50 | 29.4 | 53 | 19 | 44 | 19.5 | 14 | 8.5 | 32 | 150 | 60 |
| +60° C. | 28 | 18 | 31 | 11.3 | 23 | 15 | 9.5 | 7 | 25 | 14 | 9 |

TABLE 4-continued

| | EXAMPLE | | | | | | | | | | |
|---|---|---|---|---|---|---|---|---|---|---|---|
| | 1 | 2 | 3 (*) | 4 | 5 | 6 | 7 | 8 | 9 | 10 (*) | 11 (*) |
| | Brookfield viscosity: 2000 mPa/sec (temperature: ° C.) | | | | | | | | | | |
| | 40 | 56 | 45 | 35 | 50 | 51 | 42 | 36 | 48 | — | — |
| | DMTA ANALYSIS (MPa) | | | | | | | | | | |
| E.M.[1] | 20 | 17 | 18 | 6.8 | 16 | 10 | 7 | 5.5 | 15 | 12 | 8 |
| $V_1$[2] | 272 | 372 | 1479 | 437.7 | 231 | 98 | 227.5 | 97 | 228 | 1786 | 1591 |

(*)comparative;
[1]equilibrium modulus;
[2]variation between the modulus of elasticity value measured at −40° C. and the modulus of elasticity value measured at +60° C.

The data given in Table 4 show that the radiation curable compositions according to the present invention (Example 1, 2, 4, 5, 6, 7, 8 and 9) are better with respect to the comparative compositions. In particular, the above reported data show that:
- the use of an oligomer having a too high glass transition temperature ($T_g$) (Example 3) leads to obtain an excessive increase in the modulus of elasticity value at low temperature (−40° C.);
- both the commercial single coating (Example 10) and the mixture of two commercial coatings (Example 11) show an excessive increase in the modulus of elasticity value at low temperature (−40° C. as showed also in the enclosed FIG. 3).

EXAMPLE 13

Production of Optical Fiber

Coloured optical fibers were produced according to the techniques known in the art. Four optical glass fibers comprising a glass portion having 125 μm diameter were coated with a single coating 60 μm thick utilizing the radiation curable compositions according to the present invention (compositions of Examples 1, 2 and 7) and, as a comparison, the composition of Example 11.

An acrylic-based ink coating 7 μm thick (Cablelite® from DSM) was applied onto the single coating obtained as described above from the compositions of Examples 1, 2 and 7.

ESEMPIO 14

Microbending Test

Microbending attenuation on the optical fiber obtained as disclosed in Example 12 (single coating made from the compositions of Examples 1, 2, 7 and 11), were determined by the "expandable bobbin method" as described, for example, by G. Grasso and F. Meli in: "Microbending losses of cabled single-mode fibers", ECOC '88, pp. 526-ff, or as defined by IEC standard 62221 (Optical fibers—Measurement methods—Microbending sensitivity—Method A, Expandable drum; October 2001).

The test was performed by winding a 100 m length optical fiber with a tension of 55 g on a 300 mm diameter expandable metallic bobbin, coated with rough material (3M Imperial® PSA-grade 40 μm).

The bobbin was connected with a personal computer which controls:
- the expansion of the bobbin (in terms of variation of fiber length); and
- the fiber transmission loss.

The bobbin was then gradually expanded while monitoring fiber transmission loss versus fiber strain.

The pressure exerted onto the fiber was calculated from the fiber elongation by the following formula:

$$p = \frac{EA\varepsilon}{R}$$

wherein E is the modulus of elasticity value of glass, A is the area of the coated fiber, ε is the fiber elongation, and R is the bobbin radius.

For each optical fiber, the MAC was determined as follows:

$$MAC = \frac{MFD}{\lambda_{co}}$$

wherein MFD (mode field diameter according to Petermann definition) at 1550 nm and $\lambda_{co}$ (lambda fiber cutoff—2 m length) were determined according to ITUT G650 standard.

By measuring the microbending attenuation at different temperatures, respective microbending attenuation vs temperature curves were obtained for optical fibers coated according to Example 12. Table 5 shows the values of microbending attenuation obtained from said curves at different temperature, from −40° C. to +60° C.

TABLE 5

| | EXAMPLE | | | |
|---|---|---|---|---|
| | 1 | 2 | 7 | 11 (*) |
| | MICROBENDING ATTENUATION (dB/km)/(g/cm) | | | |
| −40° C. | 14.5 | 9.8 | 5.3 | 28.2 |
| −20° C. | 8.9 | 7.5 | 3.6 | 14.3 |
| −10° C. | 7.0 | 6.8 | 3.0 | — |
| +0° C. | 3.3 | 6.5 | 2.5 | 10.7 |
| +10° C. | 2.7 | 6.5 | 2.3 | — |
| +25° C. | 2.6 | 5.8 | 2.0 | 6.2 |
| +60° C. | 2.5 | 4.2 | 1.8 | 4.6 |
| | MAC | | | |
| | 8 | 7.9 | 7.5 | 8.3 |
| | $V_2$[1] | | | |
| | 12.0 | 5.6 | 3.5 | 23.6 |

(*): comparative;
[1]microbending variation between −40° C. and +60° C.

The invention claimed is:

1. An optical fiber comprising:
    a glass portion; and
    at least one protective coating layer disposed to surround said glass portion;
    said at least one protective coating layer having a modulus of elasticity value between 5 MPa and 600 MPa over the range between −40° C. and +60° C.

2. The optical fiber according to claim 1, wherein the modulus of elasticity value is not higher than 500 MPa.

3. The optical fiber according to claim 2, wherein the modulus of elasticity value is not higher than 450 MPa.

4. The optical fiber according to claim 3, wherein the modulus of elasticity value is not higher than 300 MPa.

5. The optical fiber according to claim 1, wherein the modulus of elasticity value is not lower than 8 MPa.

6. The optical fiber according to claim 4, wherein the modulus of elasticity value is higher than 12 MPa.

7. The optical fiber according to claim 1, wherein the protective coating layer is disposed in contact with said glass portion.

8. The optical fiber according to claim 1, wherein the protective coating layer is a single protective coating layer which is disposed in contact with said glass portion.

9. The optical fiber according to claim 1, wherein variation ($V_1$) between the modulus of elasticity value measured at −40° C. and the modulus of elasticity value measured at +60° C. of the protective coating layer, is not higher than 495 MPa.

10. The optical fiber according to claim 9, wherein the variation ($V_1$) between the modulus of elasticity value measured at −40° C. and the modulus of elasticity value measured at +60° C. of the protective coating layer is not higher than 320 MPa.

11. The optical fiber according to claim 10, wherein the variation ($V_1$) between the modulus of elasticity value measured at −40° C. and the modulus of elasticity value measured at +60° C. of the protective coating layer is not higher than 150 MPa.

12. The optical fiber according to claim 1, wherein the protective coating layer has an equilibrium modulus (E.M.) higher than 5 MPa.

13. The optical fiber according to claim 1, wherein the microbending variation ($V_2$) between −40° C. and +60° C., measured by winding a 100 m length fiber with a tension of 5 g on a 300 mm diameter expandable metallic bobbin coated with rough material, is not higher than 20 (dB/km)/(g/mm).

14. The optical fiber according to claim 13, wherein the microbending variation ($V_2$) between −40° C. and +60° C., measured by winding a 100 m length fiber with a tension of 5 g on a 300 mm diameter expandable metallic bobbin coated with rough material, is not higher than 15 (dB/km)/(g/mm).

15. The optical fiber according to claim 14, wherein the microbending variation ($V_2$) between −40° C. and +60° C., measured by winding a 100 m length fiber with a tension of 5 g on a 300 mm diameter expandable metallic bobbin coated with rough material, is not higher than 6 (dB/km)/(g/mm).

16. The optical fiber according to claim 1, wherein the protective coating is obtained by curing a radiation curable composition comprising:
    (a) at least one ethylenically unsaturated polyurethane having a glass transition temperature ($T_g$) between −40° C. and −100° C.; and
    (b) at least one polyfunctional reactive diluent monomer.

17. The optical fiber according to claim 16, wherein the ethylenically unsaturated polyurethane (a) has a glass transition temperature ($T_g$) between −50° C. and −85° C.

18. The optical fiber according to claim 16, wherein the ethylenically unsaturated polyurethane (a) is obtained by reacting the following compounds:
    (A) at least one polyol compound comprising a structural unit represented by the following formula (I):

wherein n is an integer from 0 to 4 inclusive; $R_1$, $R_2$, $R_3$, $R_4$, $R_5$ and $R_6$, which may be equal or different from each other, represent a hydrogen atom or a $C_1$-$C_4$ alkyl group;
    (B) at least one polyisocyanate compound; and
    (C) at least one (meth) acrylate compound containing at least one hydroxyl group.

19. The optical fiber according to claim 18, wherein the polyol compound (A) is selected from compounds obtained by polymerizing at least one compound selected from ethylene glycol, polyethylene glycol, propylene glycol, polypropylene glycol, tetramethylene glycol, 2-alkyl-1,4-butanediol and 3-alkyl-1,4-butanediol; compounds obtained by ring-opening polymerization of 2-alkyl-tetrahydrofuran or 3-alkyl-tetrahydrofuran; compounds obtained by copolymerization of 2-alkyl-tetrahydrofuran, 3-alkyl-tetrahydrofuran or 2-alkyl-1,4-butanediol, with a cyclic ether, or mixtures thereof.

20. The optical fiber according to claim 19, wherein the cyclic ether is selected from ethylene oxide, propylene oxide or tetrahydrofuran, or mixtures thereof.

21. The optical fiber according to claim 18, wherein the polyol compound (A) is selected from polybutadiene with a terminal hydroxyl group, hydrogenated polybutadiene with a terminal hydroxyl group, polyisobutylene polyol, 1,6-hexanediol, neopentyl glycol, 1,4-cyclohexane dimethanol, bisphenol A, bisphenol F, alkylene oxide adducts of bisphenol A, alkylene oxide adducts of bisphenol F, dimethylolized compound of dicyclopentadiene, polyester diols, polycaprolactone diols, polycarbonate diols, or mixtures thereof.

22. The optical fiber according to claim 18, wherein the polyisocyanate compound (B) is selected from polyisocyanates of 2,4-tolylenediisocyanate, 2,6-tolylenediisocyanate, 1,3-xylenediisocyanate, 1,4-xylenediisocyante, 1,5-naphthalenediisocyanate, m-phenylenediisocyanate, p-phenylenediisocyanate, 3,3'-dimethyl-4,4'-diphenylmethanediisocyanate, 4,4'-diphenyl-methanediisocyanate, 3,3'-dimethylphenylenediisocyanate, 4,4'-biphenylenediisocyanate, 1,6-hexamethylenediisocyanate, isophoronediisocyanate, methylenebis(4-cyclohexylisocyanate), 2,2,4-trimethylhexamethylenediisocyanate, 2,4,4-trimethylhexamethylenediisocyanate, 1,4-hexa-methylenediisocyanate, bis (2-isocyanateethyl)fumarate, 6-isopropyl-1-, 3-phenyldiisocyanate, 4-diphenylpropaneisocyanate, lysinediisocyanate, or mixtures thereof.

23. The optical fiber according to claim 18, wherein the (meth)acrylate compound having at least one hydroxyl group (C) is selected from 2-hydroxyethyl-(meth)acrylate, 2-hydroxypropyl (meth)-acrylate, 2-hydroxy-3-phenyloxypropyl (meth)-acrylate, propanediol(meth)acrylate, 1,4-butanediol-mono(meth)acrylate, 2-hydroxyalkyl-(meth)acryloyl phosphate, 4-hydroxycyclohexyl(meth)acrylate, 1,6-hexanediol-mono(meth)acrylate, neopentylglycolmono(meth)-acrylate, trimethylolpropane-di(meth)acrylate, trimethylolethanedi(meth) acrylate, penta-erythritholtri(meth) acrylate, dipentaerythritolpenta(meth)acrylate, (meth)acrylates represented by the following formulae (II) or (III):

wherein $R_5$ represents a hydrogen atom or a methyl group and n is an integer of from 1 to 15 inclusive; or mixtures thereof.

24. The optical fiber according to claim 16, wherein the polyfunctional reactive diluent monomer (b) is selected from ethylene glycol di(meth)acrylate, tetraethylene glycol di(meth)acrylate, propanediol di(meth)acrylate, 1,4-butanediol di(meth)acrylate, trimethylolpropane di(meth)acrylate, trimethylolpropane tri(meth)acrylate, neopentyl glycol di(meth)acrylate, 1,6-hexanediol di(meth)acrylate, 1,6-hexamethylenedihydroxy di(meth)acrylate, polyethylene glycol di(meth)acrylate, polypropylene glycol di(meth)acrylate, hydroxypivalic acid neopentyl glycol ester di(meth)acrylate, trimethylolpropane tri(meth)acrylate, trimethylolpropanetrioxyethyl (meth)acrylate, tricyclodecanedimethanol di(meth)acrylate, dicyclopentadiene di(meth)acrylate, pentaerythritol tri(meth)acrylate, pentaerythritol tetra(meth)acrylate, pentaerythritol trioxyethyl (meth)acrylate, pentaerythritol tetraoxyethyl (meth)acrylate, di(meth)acrylate of a diol, the addition compound of ethylene oxide or propylene oxide with bisphenol A, hydrogenated bisphenol A glycidyl ether of bisphenol A, or mixtures thereof.

25. The optical fiber according to claim 24, wherein the polyfunctional reactive diluent monomer (b) is 1,6-hexane diol diacrylate, pentaerythritol triacrylate, or a mixture of pentaerythritol triacrylate and pentaerythritol tetraacrylate.

26. The optical fiber according to claim 16 wherein the radiation curable composition comprises at least one polymerization initiator (c).

27. The optical fiber according to claim 26, wherein the polymerization initiator (c) is selected from benzophenone, benzoin, benzoinisobutyl ether, benzyl, benzoinethyl ether, 2,2-dimethoxy-2-phenylacetophenone, xanthone, fluorenone, 4-chlorobenzophenone, triphenylamine, carbazole, 3-methylacetophenone, 4,4'-dimethyoxybenzophenone, 4,4'-diaminobenzophenone, Michler's ketone, benzoin propyl ether, acetophenone diethyl ketal, benzoin ethyl ether, 1-hydroxycyclohexylphenyl ketone, 2-hydroxy-2-methylpropiophenone, 4'-isopropyl-2-hydroxy-2-methylpropiophenone, α,α-dichloro-4-phenoxy-acetophenone, benzyl dimethyl ketal, 2,2-diethoxyacetophenone cholorothioxantone, 2-isopropylthioxantone, diethylthioxantone, 3,3-dimethyl-4-methoxybenzophenone, 2-methyl-1-[4-(methylthio) phenyl]-2-morpholinopropanone, α-hydroxycyclohexylphenyl ketone, 2,4,6-trimethylbenzoyldiphenylphosphine oxide, or mixtures thereof.

28. The optical fiber according to claim 26, wherein the radiation curable composition comprises at least one photo-sensitizer (f).

29. The optical fiber according to claim 28, wherein the photo-sensitizer (f) is selected from amines, ureas, phosphorus compounds, sulfur compounds, nitrils, or mixtures thereof.

30. The optical fiber according to claims 28, wherein the polymerization initiator (c) and the photo-sensitizer (f) are present in the radiation curable composition in a total amount of from 0.01% by weight to 10% by weight with respect to the total weight of said radiation curable composition.

31. The optical fiber according to claim 16, wherein the radiation curable composition comprises at least one monofunctional reactive diluent monomer (d).

32. The optical fiber according to claim 31, wherein the monofunctional reactive diluent monomer (d) is selected from 2-hydroxyethyl (meth)acrylate; 2-hydroxypropyl (meth)acrylate; 2-ethylhexyl (meth)acrylate; butoxethyl (meth)acrylate; tetrahydrofurfuryl (meth)acrylate; linear or branched alkyl (meth)acrylates; n-hexyl (meth)acrylate; cyclohexyl (meth)acrylate; isobornyl (meth)acrylate; ethoxylatd alkyl (meth)acrylates; dicyclopentenyl (meth)acrylate; diethylene glycol (meth)acrylate; ethoxydiethylene glycol (meth)acrylate; benzyl (meth)acrylate; polyethylene glycol (meth)acrylate; polypropylene glycol (meth)acrylate; methoxypolyethylene glycol (meth)acrylate; methoxypolypropylene glycol (meth)acrylate; 2-phenoxyethyl (meth)acrylate; phenoxypolyethylene glycol (meth)acrylate; alkylphenoxyethyl (meth)acrylate; alkylphenoxypolyalkylene glycol (meth)acrylate; 2-hydroxy-3-phenyloxypropyl (meth)acrylate; tetra-hydrofurfuryloxypropylalkylene glycol (meth)acrylate; dicyclopentenyloxypolyalkylene glycol (meth) acrylate; 2-hydroxyalkyl (meth)acryloyl phosphate; polyfluroalkyl (meth)acrylate; N-vinyl pyrrolidone; N-vinyl caprolactam; diacetone (meth)acrylamide; isobutoxymethyl (meth)acrylamide; N,N-dimethyl acrylamide; t-octyl (meth) acrylamide; dialkylaminoethyl (meth)acrylate; (meth)acryloylmorphoine; or mixtures thereof.

33. The optical fiber according to claim 32, wherein the linear or branched alkyl (meth)acrylates are selected from butyl (meth)acrylate, octyl-(meth)acrylate, decyl (meth)acrylate, tridecyl (meth)acrylate, stearyl (meth)acrylate, lauryl (meth)acrylate, or isodecyl (meth)acrylate.

34. The optical fiber according to claim 32, wherein the ethoxylated alkyl (meth)acrylates, are selected from methoxyethyl (meth)acrylate, ethoxylethyl (meth)acrylate, butoxyethyl (meth)acrylate, or 2-(2-ethoxyethoxy)ethyl (meth)acrylate.

35. The optical fiber according to claim 32, wherein the alkylphenoxyethyl (meth)acrylate is nonylphenoxyethyl (meth)acrylate.

36. The optical fiber according to claim 32, wherein the monofunctional reactive diluent monomer (d) is isobornyl acrylate, 2-phenoxyethyl acrylate, nonylphenoxyethyl acrylate, $C_8$-$C_{13}$ alkyl acrylates, lauryl acrylate, or isodecyl acrylate.

37. The optical fiber according to claim 31, wherein the monofunctional reactive diluent monomer (d) is present in the radiation curable composition in an amount of 3% by weight to 25% by weight with respect to the total weight of said radiation curable composition.

38. The optical fiber according to claim 16 wherein the radiation curable composition comprises at least one adhesion promoter (e).

39. The optical fiber according to claim 38, wherein the adhesion promoter (e) is an organo-functional silane selected from octyltriethoxysilane, methyltriethoxysilane, methyltrimethoxysilane, tris(3-trimethoxysilylpropyl) isocyanurate, vinyltriethoxysilane, vinyltrimethoxysilane, vinyl-tris(2- methoxyethoxy) silane, vinylmethyl-dimethoxysilane, γ-methacryloxypropyltrimethoxy-silane, β-(3,4-epoxycyclohexyl) ethyltrimethoxy-silane, γ-glycidoxypropyltrimethoxysilane, γ-mercaptopropyltrimethoxysilane, organo-modified polydimethylsiloxane, γ-ureidopropyltrialkoxy-silane, γ-ureidopropyltrimethoxysilane, γ-isocyanatepropyltriethoxysilane, or mixtures thereof.

40. The optical fiber according to claim 38, wherein the adhesion promoter (e) is represented by the following structural formula (IV):

wherein the groups R, which may be identical to or different from each other, are chosen from: alkyl, alkoxy or aryloxy groups or from halogen atoms, on condition that at least one of the groups R is an alkoxy or aryloxy group; n is an integer between 1 and 6 inclusive; X is a group selected from nitrous, mercapto, epoxide, vinyl, imido, chloro, —$(S)_m C_n H_{2n}$—Si—$(R)_3$ wherein m and n are integers between 1 and 6 inclusive and the groups R are defined as above.

41. The optical fiber according to claim 38, wherein the adhesion promoter (e) is present in the radiation curable composition in an amount of 0.1% by weight to 2.5% by weight with respect to the total weight of said radiation curable composition.

42. A radiation curable composition comprising:
(a) from 50% by weight to 95% by weight with respect to the total weight of said radiation curable composition, of at least one ethylenically unsaturated polyurethane having a glass transition temperature ($T_g$) between $-40°$ C. and $-100°$ C.; and
(b) from 5% by weight to 50% by weight with respect to the total weight of said radiation curable composition, of at least one polyfunctional reactive diluent monomer.

43. radiation curable composition according to claim 42, wherein the ethylenically unsaturated polyurethane (a) is obtained by reacting the following compounds:
(A) at least one polyol compound comprising a structural unit represented by the following formula (I):

wherein n is an integer comprised from 0 to 4 inclusive; $R_1$, $R_2$, $R_3$, $R_4$, $R_5$ and $R_6$, which may be equal or different from each other represent a hydrogen atom or a $C_1$-$C_4$ alkyl group;
(B) at least one polyisocyanate compound; and
(C) at least one (meth)acrylate compound containing at least one hydroxyl group.

44. The radiation curable composition according to claim 42, wherein the polyfunctional reactive diluent monomer is selected from ethylene glycol di(meth)acrylate, tetraethylene glycol di(meth)acrylate, propanediol di(meth)acrylate, 1,4-butanediol di(meth)acrylate, trimethylolpropane di(meth)acrylate, trimethylolpropane tri(meth)acrylate, neopentyl glycol di-(meth)acrylate, 1,6-hexanediol di(meth)acrylate, 1,6-hexamethylenedihydroxy di(meth)acrylate, polyethylene glycol di(meth)acrylate, polypropylene glycol di(meth)acrylate, hydroxypivalic acid neopentyl glycol ester di(meth)acrylate, trimethylolpropane tri(meth)acrylate, trimethylolpropanetrioxyethyl (meth)acrylate, tricyclodecanedimethanol di(meth)acrylate, dicyclopentadiene di(meth)acrylate, pentaerythritol tri(meth)acrylate, pentaerythritol tetra(meth)acrylate, pentaerythritol trioxyethyl (meth)acrylate, pentaerythritol tetraoxyethyl (meth)acrylate, di(meth)acrylate of a diol, the addition compound of ethylene oxide or propylene oxide with bisphenol A, hydrogenated bisphenol A glycidyl ether of bisphenol A, or mixtures thereof.

45. The radiation curable composition according to claim 42, further comprising at least one polymerization initiator (c).

46. The radiation curable composition according to claim 45, wherein the polymerization initiator (c) is selected from benzophenone, benzoin, benzoinisobutyl ether, benzyl, benzoinethyl ether, 2,2-dimethoxy-2-phenylacetophenone, xanthone, fluorenone, 4-chlorobenzophenone, triphenylamine, carbazole, 3-methylacetophenone, 4,4'-dimethoxybenzophenone, 4,4'-diaminobenzophenone, Michler's ketone, benzoin propyl ether, acetophenone diethyl ketal, benzoin ethyl ether, 1-hydroxycyclohexylphenyl ketone, 2-hydroxy-2-methylpropiophenone, 4'-isopropyl-2-hydroxy-2-methylpropiophenone, α,α-dichloro-4-phenoxy-acetophenone, benzyl dimethyl ketal, 2,2-diethoxyacetophenone chlorothioxantone, 2-isopropylthioxantone, diethylthioxantone, 3,3-dimethyl-4-methoxybenzophenone, 2-methyl-1-[4-(methylthio) phenyl]-2-morpholinopropanone, α-hydroxycyclohexylphenyl ketone, 2,4,6-trimethylbenzoyldiphenylphosphine oxide, or mixtures thereof.

47. The radiation curable composition according to claim 45, further comprising at least one photo-sensitizer (f).

48. The radiation curable composition according to claim 47, wherein the photo-sensitizer (f) is selected from amines, ureas, phosphorus compounds, sulfur compounds, nitrils, or mixtures thereof.

49. The radiation curable composition according to claim 38, further comprising at least one monofunctional reactive diluent monomer (d).

50. The radiation curable composition according to claim 49, wherein the monofunctional reactive diluent monomer (d) is selected from 2-hydroxyethyl (meth)acrylate; 2-hydroxypropyl (meth)acrylate; 2-ethylhexyl (meth)acrylate; butoxyethyl (meth)acrylate; tetrahydrofurfuryl (meth)acrylate; linear or branched alkyl (meth)acrylates; butyl (meth)acrylate, octyl-(meth)acrylate, decyl (meth)acrylate, tridecyl (meth)acrylate, stearyl (meth)acrylate, lauryl (meth)acrylate, isodecyl (meth)acrylate); n-hexyl (meth)acrylate; cyclohexyl (meth)acrylate; isobornyl (meth)acrylate; ethoxylated alkyl (meth)acrylates; methoxyethyl (meth)acrylate, ethoxyethyl (meth)acrylate, butoxyethyl (meth)acrylate, 2-(2-ethoxyethoxy)ethyl (meth)acrylate; dicyclopentenyl (meth)acrylate; diethylene glycol (meth)acrylate; ethoxydiethylene glycol (meth)acrylate; benzyl (meth)acrylate; polyethylene glycol (meth)acrylate; polypropylene glycol (meth)acrylate; methoxpolyethylene glycol (meth)acrylate; methoxpolypropylene glycol (meth)acrylate; 2-phenoxyethyl (meth)acrylate; phenoxypolyethylene glycol (meth)acrylate; alkylphenoxyethyl (meth)acrylate; nonylphenoxyethyl (meth)acrylate; alkylphenoxypolyalkylene glycol (meth)acrylate; 2-hydroxy-3-phenyloxypropyl (meth)acrylate; tetra-hydrofurfuryloxypropylalkylene glycol (meth)-acrylate; dicyclopentenyloxypolyalkylene glycol (meth)acrylate; 2-hydroxyalkyl(meth)acryloyl phosphate; polyfluroalkyl (meth) acrylate; N-vinyl pyrrolidone; N-vinyl caprolactam; diacetone (meth)acrylamide; isobutoxymethyl (meth)acrylamide; N,N-dimethyl acrylamide; t-octyl (meth)acrylamide; dialkylaminoethyl (meth)acrylate; (meth)acryloylmorpholine; or mixtures thereof.

51. The radiation curable composition according to claim 42, further comprising at least one adhesion promoter (e).

52. The radiation curable composition according to claim 51, wherein the adhesion promoter (e) is an organo-functional silane selected from octyltriethoxysilane, methyltriethoxysilane, methyltrimethoxysilane, tris(3-trimethoxysilylpropyl) isocyanurate, vinyltriethoxysilane, vinyltrimethoxysilane, vinyl-tris(2-methoxyethoxy)silane, vinylmethyl-dimethoxysilane, γ-methacryloxypropyltrimethoxy-silane, β-(3,4-epoxycyclohexyl)ethyltrimethoxy-silane, γ-glycidoxypropyltrimethoxysilane, γ-mercaptopropyltrimethoxysilane, organo-modified polydimethylsiloxane, γ-ureidopropyltrialkoxy-silane, γ-ureidopropyltrimethoxysilane, γ-isocyanatepropyltriethoxysilane, or mixtures thereof.

53. The radiation curable composition according to claim 42, having a Brookfield viscosity between 1000 m.Pa·sec and 4000 m.Pa·sec in a temperature range of from 20° C. to 80° C.

54. A method for controlling the attenuation losses caused by microbending on the signal transmitted by an optical fiber comprising an internal glass portion, which comprises providing at least one protective coating layer disposed to surround said glass portion, wherein said at least one protective coating layer has a modulus of elasticity value between 5 MPa and 600 MPa over the range between −40° C. and +60° C.

55. The method according to claim 54, wherein the modulus of elasticity value between −40° C. and +60° C. is not higher than 500 MPa.

56. The method according to claim 55, wherein the modulus of elasticity value between −40° C. and +60° C. is not higher than 450 MPa.

57. The method according to claim 56, wherein the modulus of elasticity value between −40° C. and +60° C. is not higher than 300 MPa.

58. The method according to claim 54, wherein the modulus of elasticity value between −40° C. and +60° C. is not lower than 8 MPa.

59. The method according to claim 58, wherein the modulus of elasticity value between −40° C. and +60° C. is higher than 12 MPa.

60. The method according to claim 55, wherein said protective coating layer is obtained by curing a radiation curable composition comprising:
    (a) at least one ethylenically unsaturated polyurethane having a glass transition temperature ($T_g$) between −40° C. and −100° C.; and
    (b) at least one polyfunctional reactive diluent monomer.

61. The optical fiber according to claim 1, wherein said at least one protective coating layer has a refractive index at room temperature higher than the refractive index of the glass portion.

* * * * *